US012649485B2

(12) United States Patent
Wehlen et al.

(10) Patent No.: US 12,649,485 B2
(45) Date of Patent: Jun. 9, 2026

(54) MODEL-BASED PREDICTIVE CONTROL OF A MOTOR VEHICLE

(71) Applicant: ZF Friedrichshafen AG, Friedrichshafen (DE)

(72) Inventors: Timo Wehlen, Friedrichshafen (DE); Timon Busse, Munich (DE); Valerie Engel, Markdorf (DE); Lorenz Fischer, Friedrichshafen (DE); Matthias Zink, Kressbronn (DE); Raffael Selegrad, Friedrichshafen (DE); Andreas Wendzel, Grünkraut (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 16 days.

(21) Appl. No.: 18/688,526

(22) PCT Filed: Sep. 30, 2021

(86) PCT No.: PCT/EP2021/074383
§ 371 (c)(1),
(2) Date: Mar. 1, 2024

(87) PCT Pub. No.: WO2023/030646
PCT Pub. Date: Mar. 9, 2023

(65) Prior Publication Data
US 2024/0351604 A1     Oct. 24, 2024

(30) Foreign Application Priority Data
Sep. 3, 2021    (DE) ..................... 10 2021 209 706.5

(51) Int. Cl.
*B60W 50/16*      (2020.01)
*B60W 20/11*      (2016.01)
*B60W 50/14*      (2020.01)

(52) U.S. Cl.
CPC ............ *B60W 50/16* (2013.01); *B60W 20/11* (2016.01); *B60W 2050/143* (2013.01);
(Continued)

(58) Field of Classification Search
CPC ................. B60W 50/16; B60W 20/11; B60W 2050/143; B60W 2050/146; B60W 60/001
See application file for complete search history.

(56) References Cited

U.S. PATENT DOCUMENTS 6,092,021  A      7/2000  Ehlbeck et al.
2009/0243827  A1    10/2009  Burke et al.
(Continued)

FOREIGN PATENT DOCUMENTS

WO      WO 2013/110706 A1      8/2013
WO      WO 2021/089150 A1      5/2021

OTHER PUBLICATIONS

International Search Report and Written Opinion received for Application No. PCT/EP2021/074383 mailed Jun. 22, 2022 (12 pages).

*Primary Examiner* — George C Jin
(74) *Attorney, Agent, or Firm* — Crowell & Moring LLP

(57)     ABSTRACT

A method for model-based predictive control (MPC) of a motor vehicle includes executing an MPC algorithm having a high level solver module, a longitudinal dynamics model, and a cost function dedicated to the high level solver module. By executing the high level solver module for an upcoming route segment while taking the longitudinal dynamics model into account, a speed trajectory is calculated that minimizes the cost function, according to which the motor vehicle is to travel within a prediction horizon. The method includes sending the speed trajectory to a human-machine interface as an input value, processing the speed trajectory to obtain a control signal in the human- (Continued)

Figure 1:
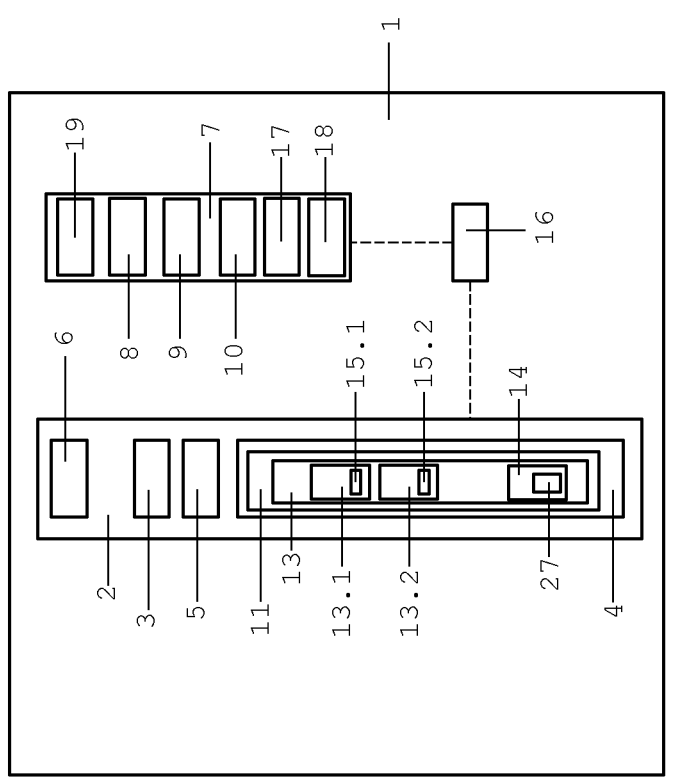

machine interface, and outputting the control signal to a driver of the motor vehicle with the human-machine interface, such that the driver can control the motor vehicle in accordance with the control signal.

11 Claims, 3 Drawing Sheets

(52) U.S. Cl.
    CPC ... *B60W 2050/146* (2013.01); *B60W 2554/20* (2020.02); *B60W 2720/10* (2013.01)

(56)                References Cited

U.S. PATENT DOCUMENTS

| | | | |
|---|---|---|---|
| 2010/0211247 A1* | 8/2010 | Sherony | B60W 40/076 |
| | | | 701/1 |
| 2020/0164745 A1 | 5/2020 | Mohan et al. | |
| 2020/0339150 A1* | 10/2020 | Olsson | B60W 10/184 |
| 2022/0371590 A1* | 11/2022 | Busse | B60G 17/0195 |
| 2023/0034418 A1* | 2/2023 | Busse | B60W 50/00 |

* cited by examiner

MODEL-BASED PREDICTIVE CONTROL OF A MOTOR VEHICLE

CROSS-REFERENCE TO RELATED APPLICATIONS

This application is a U.S. national stage application under 35 U.S.C. § 371 of PCT Application No. PCT/EP2021/074383, filed on Sep. 30, 2021, and published as WO 2023/030646 A1 on Mar. 9, 2023, which claims priority from German Application No. DE 10 2021 209 706.5, filed on Sep. 3, 2021, the entirety of which are each hereby fully incorporated by reference herein.

The invention relates to model-based predictive control of a motor vehicle. In particular, a method for model-based predictive control of a motor vehicle is claimed.

Current intelligent cruise controls (so-called "predictive green ACCs") for motor vehicles are able to take route topology into account, but the driving strategy and thus the longitudinal control is rule-based. This rule-based implementation normally results in less than optimal solutions with regard to fuel consumption, comfort, and driving time. As the drive systems become more complex, these rules become more complex and require more computing power. An optimal operation of a vehicle (e.g. with regard to fuel consumption, comfort, and driving time) can only be achieved with familiarity with the route. A driver of the motor vehicle must therefore drive proactively, but only has limited knowledge of the route ahead, and no knowledge of upcoming driving obstacles.

The object of the present invention is to create a method for controlling a motor vehicle, that takes the problems described above into account.

This problem is solved by the subject matter of the independent claims. Advantageous embodiments are the subject matter of the dependent claims, the following description, and the drawings.

The present invention proposes the use of a human-machine interface (HMI) with which a speed trajectory of a motor vehicle is output to a driver. The speed trajectory is first calculated by a model-based predictive control method and then sent to the human-machine interface for processing and then output to the driver. Ideally, the driver can then follow the calculated speed trajectory to drive more efficiently. In other words, a functional architecture is proposed that comprises a model-based predictive control (MPC solver) and a sequential human-machine interface. The MPC solver can be referred to as a "high level solver module" (HLS), which assumes the rough long-term planning of the longitudinal trajectory of the motor vehicle, using the MPC approach for this.

In this regard, a method for model-based predictive control of a motor vehicle is created in a first aspect of the invention. An MPC algorithm is carried out that comprises a high level solver module, a longitudinal dynamics model, and a cost function dedicated to the high level solver module, in which, by executing the high level solver module for an upcoming route segment, taking the longitudinal dynamics model into account, a speed trajectory is calculated that minimizes costs, according to which the motor vehicle is to travel within a prediction horizon. The length of the prediction horizon is 500 meters in a preferred exemplary embodiment, but can also be varied. The high level solver module solves a non-linear problem and works with continuous compensation variables for discrete operating states (e.g. gears). This approach has less effect on the solution space than when discrete operating states are taken into consideration. This results in advantages with regard to obtaining optimal results.

In another step, which takes place after calculating the speed trajectory, the speed trajectory calculated by the high level solver module is sent to a human-machine interface as an input value. A human-machine interface can be understood in general to be a function or component in a specific device or a specific software application with which humans can operate machines, and interact therewith. Some examples of HMI devices are touchscreens and keyboards. The speed trajectory calculated by the high level solver module is used by the human-machine interface to generate a control signal. The control signal is then output to the motor vehicle driver by the human-machine interface such that the driver of the motor vehicle can control the vehicle in accordance with the control signal based on the speed trajectory calculated by the high level solver module.

The present invention makes use of the "model predictive control" (MPC) approach. There are three process steps in this model-based predictive control. In a first step, a virtual driving horizon (prediction horizon) is generated on the basis of available map data and sensor data. The prediction horizon serves as the solution space for a trajectory planner and controller, in which a longitudinal trajectory of the motor vehicle is generated, e.g. the speed or torque trajectory. In a second step, an iterative online generation and control of a longitudinal trajectory takes place through optimization of the trajectory with regard to the present performance goals of the MPC approach. In a third step, the calculated trajectory is automatically implemented. The third step is irrelevant in an HMI-based system or method. Instead, a human-machine interface is used, with which the trajectory generated in the second step is output to the driver. The driver can then follow the recommended trajectory, thus driving more efficiently. The present invention therefore presents a method and an architecture that unites the function of the second step with the requirements of a human-machine interface designed for automotive applications.

In one embodiment, the control signal illustrates the speed trajectory in the human-machine interface that was calculated by the high level solver module. The speed trajectory proposed by the high level solver module is thus implemented by the human-machine interface.

The control signal can be shown on a display, or it can be an acoustic or tactile signal. These different types of outputs can also be combined. In one embodiment, the human-machine interface comprises a video system, with which the control signal is shown to the driver as visual feedback, and/or an audio system, with which the control signal is output to the driver as acoustic feedback, and/or a tactile system, with which the control signal is output to the driver as tactile feedback, e.g. a vibration.

The rough long-term planning of the trajectory is based on the route. This allows for correct, optimal dealing with inanimate (i.e. stationary) objects within the prediction horizon. Examples of these objects are inclines, speed limits, other traffic signs (e.g. "Stop" or "Yield" signs), curves, or traffic lights. Information regarding inanimate objects is sent to the high level solver module as constraints that are taken into account by the high level solver module when calculating the speed trajectory.

Dynamic objects can also be taken into account when calculating the speed trajectory. These are only roughly taken into account in the high level solver module, because of the long computing times they require. Information regarding dynamic objects is sent to the high level solver module as constraints in one embodiment, which is then taken into account by the high level solver module when calculating the speed trajectory.

The speed trajectory that is adjusted for the dynamic objects may need to be corrected by a reactive actuator. This rough speed plan calculated by the high level solver module is just a suggestion, which the driver can, and may need to, ignore, in particular during dynamic driving maneuvers. In this regard, the human-machine interface outputs the speed trajectory calculated by the high level solver module to the driver of the motor vehicle as a suggestion in one embodiment.

Two signals can be sent to the human-machine interface, one of which can be a speed trajectory calculated by the high level solver module, proposed as a speed trajectory optimized for efficiency (based on the cost function), while the other one is the current speed of the motor vehicle. Various human-machine interactions can be derived from the difference between these values, which encourage the driver to follow the speed trajectory suggested by the high level solver module. In this regard, a current speed of the motor vehicle is entered in one embodiment of the human-machine interface, from which the difference between the current speed of the motor vehicle and an associated speed from the speed trajectory calculated by the high level solver module is subsequently determined by the human-machine interface. Furthermore, a difference signal that represents the speed difference is generated by the human-machine interface as a control signal, which is then output to the driver. The difference signal is preferably output such that it encourages the driver to follow the speed trajectory suggested by the high level solver module.

Instead of comparing the optimized speed with the current speed, the comparison can be between torques. This involves a comparison of the torque currently desired by the driver with an optimized torque calculated by the model-based predictive control. In this regard, a method for model-based predictive control of a motor vehicle is created according to one aspect of the invention in which an MPC algorithm is carried out that comprises a torque solver module, a longitudinal dynamics model, and a cost function dedicated to the torque solver module, such that when the torque solver module is applied to a drive unit in the motor vehicle (e.g. an internal combustion engine or an electric motor, or a combination thereof), a drive torque trajectory that minimizes costs is calculated, according to which the drive torques are to be provided to the drive assembly within a prediction horizon. The drive torque trajectory calculated by the torque solver module is entered in the human-machine interface, and a current drive torque in the drive assembly is also entered in the human-machine interface, e.g. by a sensor system configured for this. A drive torque difference is obtained by the human-machine interface, in which an associated drive torque in the drive torque trajectory calculated by the torque solver module is subtracted from the current drive torque. A drive torque control signal is also generated by the human-machine interface and output to the driver, such that the driver can control the motor vehicle in accordance with the drive torque control signal based on the drive torque difference.

The torques in the drive assembly described above normally have positive values, because they propel or accelerate the motor vehicle, while braking torques in the motor vehicle normally have negative values, since they slow the vehicle. Determining the difference and outputting the difference signal described above can also be carried out when braking. In this regard, the drive torque trajectory comprises a sequence of braking torques in another embodiment, that describe the braking within the prediction horizon, in which the sequence of braking torques is entered in the human-machine interface, and in which a current braking torque is also entered in the human-machine interface. A braking torque difference is determined by the human-machine interface, in which an associated braking torque in the sequence of braking torques calculated by the torque solver module is subtracted from the current braking torque. A braking torque control signal is also generated by the human-machine interface and output to the driver such that the driver can control the motor vehicle in accordance with the braking torque control signal based on the braking torque difference.

With regard to torques, a tactile pedal can be used as the human-machine interface, which gives tactile feedback to the driver. The goal here is also to encourage the driver to drive more efficiently. In this regard, the human-machine interface comprises a tactile pedal in one embodiment, with which the pedal outputs a drive torque control signal if it is the gas pedal, and/or a braking torque control signal if it is the brake pedal, that the driver can feel in his foot as tactile feedback.

Figure 2:
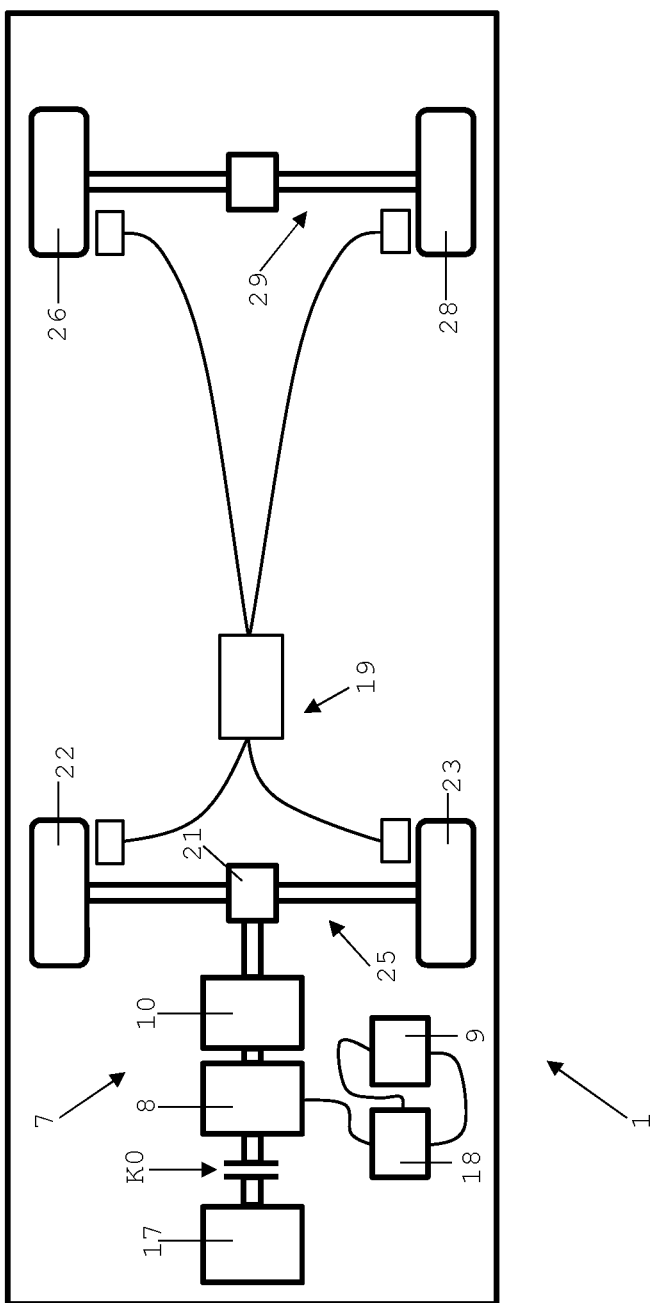
Figure 3:
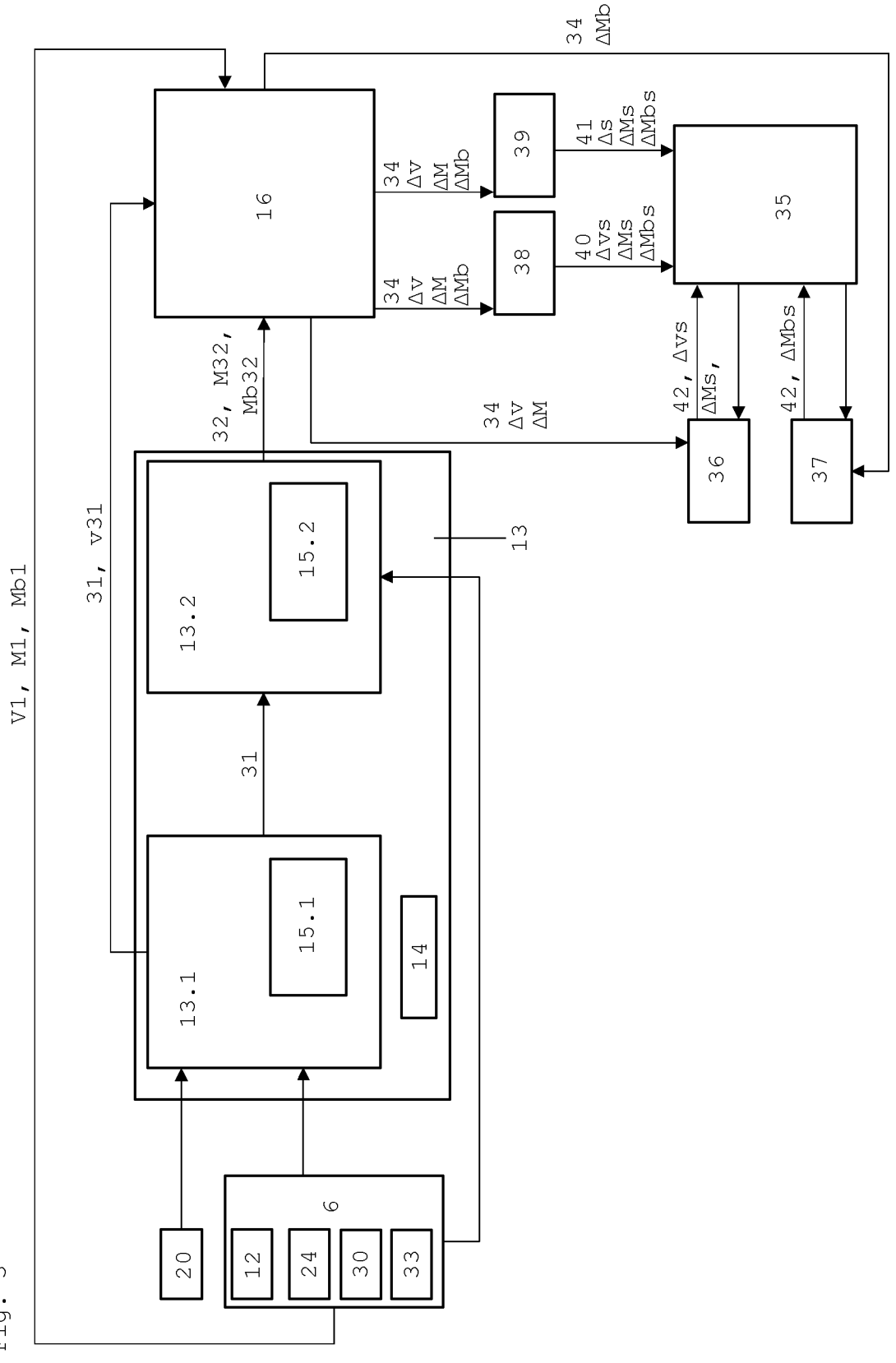

Exemplary embodiments of the invention shall be explained in greater detail below in reference to the schematic illustrations, in which the same or similar elements have the same reference symbols. Therein:

FIG. 1 shows a schematic illustration of a motor vehicle, the drive train of which comprises an internal combustion engine, an electric machine, and brakes, FIG. 2 shows details of an exemplary drive train for the motor vehicle shown in FIG. 1, and FIG. 3 shows an exemplary embodiment of a method according to the invention for model-based predictive control of the motor vehicle shown in FIG. 1.

FIG. 1 shows a motor vehicle 1, e.g. a passenger automobile. The motor vehicle 1 contains a system 2 for model-based predictive control of the motor vehicle 1. The system 2 comprises a processor 3, a memory 4, a communication interface 5, and a detection unit 6, in particular for detecting state data relating to the motor vehicle 1 in this exemplary embodiment.

The motor vehicle 1 also comprises a drive train 7, which can comprise, e.g., an electric machine 8, which can be operated as a motor and a generator, a battery 9, a transmission 10, and brakes 19. The electric machine 8 can drive the wheels of the motor vehicle 1 via the transmission 10 when functioning as a motor. The electricity needed for this can come from the battery 9, in particular via power electronics 18. The battery 9 can also be charged by the electric machine 8 via the power electronics 18, when the electric machine 8 is functioning as a generator (recuperation). The battery 9 can also be charged at an external charging station.

FIG. 2 also shows that the drive train 7 is a hybrid drive train, which also contains an internal combustion engine 17. The internal combustion engine 17 can also power the motor vehicle 1 in the exemplary parallel P2 architecture of the hybrid drive train 7 shown in FIG. 2, when the clutch K0 between the internal combustion engine 17 and the electric machine 8 is engaged. The internal combustion engine 17 can also power the electric machine 8 to charge the battery 9. The electric machine 8 can drive two front wheels 22, 23 of the motor vehicle 1 with a positive drive torque applied to a front axle 25 via the transmission 10 and a front differential transmission 21 in this exemplary embodiment (when the clutch K0 is engaged, supported by the internal combustion engine 17). A first rear wheel 26 and second rear wheel 28 on the rear axle 29 of the motor vehicle 1 are not powered in this exemplary embodiment (although rear-wheel drives and all-wheel drives are also possible). The front wheels 22, 23 and rear wheels 26, 28 can be braked by the brakes 19 in the drive train 7, at which point the brakes 19 provide a negative braking torque.

A computer program 11 can be stored in the memory 4. The computer program 11 can be executed in the processor 3, for which reason the processor 3 and memory 4 are connected to one another by the communication interface 5. When the computer program 11 is executed in the processor 3, the processor 3 fulfills the functions described in conjunction with the drawings, and executes the steps of the method.

The computer program 11 contains an MPC algorithm 13 containing a high level solver module 13.1. the MPC algorithm 13 also contains a longitudinal dynamics model 14 of the motor vehicle 1. The high level solver module 13.1 can access the longitudinal dynamics model 14. The MPC algorithm 13 also contains a minimizing high level cost function 15.1, which is dedicated to the high level solver module 13.1.

The longitudinal dynamics model 14 comprises a loss model 27 for the motor vehicle 1. The loss model 27 describes the operating behavior of components that relate to efficiency, e.g. the electric machine 8, the internal combustion engine 17, and the brakes 19, with regard to their efficiency, or losses. The overall losses of the motor vehicle 1 are derived from this. The processor 3 executes the MPC algorithm 13 and predicts the behavior of the motor vehicle 1 for a specific prediction horizon (e.g. with a length of 500 meters). This prediction is based on the longitudinal dynamics model 14. The processor 3 calculates an optimized speed trajectory 31 by executing the high level solver module 13.1, according to which the motor vehicle 1 is to travel within the prediction horizon. The optimized speed trajectory 31 is calculated for an upcoming route segment taking the longitudinal dynamics model 14 into account, in which the high level cost function 15.1 is minimized. The high level solver module 13.1 assumes the rough long-term planning for the longitudinal trajectory 31, and uses the MPC approach for this. The rough long-term planning of the trajectory 31 is therefore based on the route. This allows in particular for a correct, optimal dealing with inanimate objects (inclines, speed limits, other traffic signs, e.g. "Stop" or "Yield" signs, curves, and traffic lights). The length of the driving horizon in the present example is 500 meters.

In addition to, or instead of, the high level solver module 13.1, the MPC algorithm 13 can contain a torque solver module 13.2 with a dedicated torque cost function 15.2. The torque solver module 13.2 can access the longitudinal dynamics model 14. By executing the torque solver module 13.2, the processor 3 calculates an optimized torque trajectory 32 that minimizes the torque cost function 15.2 for the prediction horizon for the electric machine 8 and/or the internal combustion engine 17, and/or for the brakes 19 in the motor vehicle 1, according to which the electric machine 8 and/or the internal combustion engine 17, and/or the brakes 19 are to provide torques within the prediction horizon.

The detection unit 6 can measure current state variables for the motor vehicle 1, record corresponding data, and send this to the high level solver module 13.1, the torque solver module 13.2, and a human-machine interface 16, described below. The detection unit 6 can contain a speed sensor 24 and a torque sensor 30 for this. A current speed of the motor vehicle 1 can be determined with the speed sensor 24. A current torque of the motor vehicle 1 can be determined with the torque sensor 30, e.g. a current drive torque from the electric motor 8 or the internal combustion engine 17, or a current braking torque from the brakes 19.

Furthermore, information regarding stationary objects and/or route data from an electronic map in a navigation system 20 for the motor vehicle 1 for a prediction horizon (e.g. 500 meters) in front of the motor vehicle 1, can be updated in cycles, and sent to the high level solver module 13.1. The route data can contain information regarding inclines, curves, speed limits, traffic lights, and stops. Moreover, maximum lateral acceleration in a curve can be calculated to obtain a speed limit for the motor vehicle 1. The detection unit 6 can be used to locate the motor vehicle 1, in particular using signal generated by a GNSS sensor 12 for locating the vehicle precisely on an electronic map. The detection unit 6 can also contain an environment sensor 33 that scans the external environment of the motor vehicle 1, e.g. a radar sensor, camera system, and/or lidar sensor. Consequently, dynamic objects can also be detected outside the motor vehicle 1, e.g. other vehicles or pedestrians. The processor 3 can also access information regarding these objects via the communication interface 5. This information can be incorporated in the longitudinal model 14 of the motor vehicle 1, in particular as limits or constraints in the calculation of the speed trajectory 31 and/or the torque trajectory 32.

The output from the optimization by the MPC algorithm comprises optimal speeds for the motor vehicle 1 and torques for the electric machine 8 and/or the internal combustion engine 17 and/or the brakes 19 at calculated points within the prediction horizon. The speed trajectory 31 and/or the torque trajectory 32 proposed by the MPC algorithm are sent to a human-machine interface 16 in the present invention, as shall be described in greater detail in reference to FIG. 3 below.

FIG. 3 shows that input data from navigation system 20 (in particular map data) are sent to the high level solver module 13.1. The high level solver module 13.1 also receives input data from the detection unit 6, in particular vehicle state data for the motor vehicle 1 and other information regarding dynamic objects described above from the sensors 12, 24, 30, 33 in the motor vehicle 1. Taking the input data into account, the processor 3 calculates the speed trajectory 31 with the high level solver module 13.1, as described above. The speed trajectory calculated by the high level solver module 13.1 is subsequently sent to the human-machine interface 16 as an input value. Other input data from the navigation system 20 and the detection unit 6 can also be sent to the human-machine interface 16, e.g. the vehicle state data as well as the other data from the sensors 12, 24, 30, 33 in the motor vehicle specified above.

The human-machine interface 16 processes the speed trajectory 31 calculated by the high level solver module 13.1. The human-machine interface 16 can also process the input data from the detection unit 6 and/or navigation system 20. Based on the speed trajectory 31 calculated by the high level solver module 13.1, potentially in combination with the input data from the detection unit 6 and/or the navigation system 20, the human-machine interface 16 generates a speed control signal 34. In one example, the speed control signal 34 can correspond to the speed trajectory 31 calculated by the high level solver module 13.1. The human-machine interface sends the speed control signal 34 to a driver 35 of the motor vehicle 1 such that the driver 35 can control the motor vehicle on the basis of the control signal 34. The driver 35 can do so by actuating the gas pedal 36 or brake pedal 37 in the motor vehicle 1 in accordance with the speed control signal 34.

FIG. 3 shows that the speed control signal 34 is output to the driver 35 by an output unit. The output unit can be a video system 38, e.g. a display, with which the speed control signal 34 is output to the driver 35 in the form of visual feedback 40. An audio system 39 can also be used as an output unit, which outputs the speed control signal 34 to the driver 35 as in the form of acoustic feedback 41, e.g. in the form of sounds or words.

A tactile system can also be used, with which the speed control signal 34 is output to the driver 35 in the form of tactile feedback 42. An exemplary embodiment of a tactile system is a pedal, e.g. a gas pedal 36 or brake pedal 37. The pedal 36, 37 can output the feedback 42 to the driver in the form of resistance corresponding to the speed control signal 34, or vibrations that correspond to the speed control signal 34. The gas pedal 36 and brake pedal 37 thus form an output unit in the human-machine interface 16 as well as a control element with which the driver 35 can control acceleration, speed, and/or braking of the motor vehicle 1, when the driver 35 follows the speed control signal 34 output by the human-machine interface 16.

As described above, dynamic horizon objects can also be fundamentally taken into account. This is only possible, however, roughly (because of the long computing times). The speed trajectory 31 adjusted for dynamic objects may need to be corrected by a reactive actuator. For this reason, the speed trajectory planning 31 from the high level solver module 31 is just a suggestion, which the driver 35 may have to ignore, in particular during dynamic driving maneuvers.

A current speed v1 of the motor vehicle 1 may be sent as an input value to the human-machine interface 16 by the speed sensor 24. The human-machine interface 16 can determine the difference in speeds $\Delta v$ between the current speed v1 of the motor vehicle v1 and an associated speed v31 from the speed trajectory 31 calculated by the high level solver module 13.1. The human-machine interface 16 then generates a difference signal $\Delta vs$ that represents the speed difference $\Delta v$ in the form of a control signal 34, and outputs this to the driver 35, e.g. with the video system 38, audio system 39, tactile gas pedal 36 or tactile brake pedal 37.

The drive torque trajectory 32 calculated by the torque solver 13.2 can also be sent as an input value to the human-machine interface 16. A current torque in the motor vehicle 1 can also be sent to human-machine interface 16 by the torque sensor 30 as an input value, e.g. a drive torque M1 from the electric machine 8 or the internal combustion engine 17 for powering the motor vehicle 1. The human-machine interface 16 determines the drive torque difference $\Delta M$ by subtracting an associated drive torque M32 in the drive torque trajectory 32 calculated by the torque solver module 13.2 from the current drive torque M1. The human-machine interface 16 also generates a drive torque control signal $\Delta Ms$ and outputs this to the driver 35 such that the driver 35 can control the motor vehicle 1 in accordance with the drive torque control signal $\Delta Ms$ based on the drive torque difference $\Delta M$. The tactile gas pedal 36 can output the drive torque control signal $\Delta Ms$ as a tactile feedback that the driver 35 can feel in his foot, on the basis of which the driver 35 can operate the tactile gas pedal 36.

The torque trajectory 32 calculated by the torque solver module 13.2 can also contain a braking torque Mb32, in which case a current braking torque Mb1 in the brakes 19 is sent by the torque sensor 30 to the human-machine interface 16 as an input value. The human-machine interface 16 then determines a braking torque difference $\Delta Mb$ by subtracting an associated braking torque Mb23 in the driver torque trajectory 32 calculated by the torque solver module 13.2 from the current braking torque Mb1. The human-machine interface 16 also generates a braking torque control signal $\Delta Mbs$ and outputs this to the driver 35, such that the driver 35 can control the motor vehicle 1 in accordance with the braking torque control signal $\Delta Mbs$ that is based on the braking torque difference $\Delta Mb$. The tactile brake pedal 37 can output the braking torque control signal $\Delta Mbs$ as a tactile feedback that the driver 35 can feel in his foot, based on which the driver 35 can operate the brake pedal 37.

REFERENCE SYMBOLS

K0 clutch
M1 current drive torque
Mb1 current braking torque
M32 driver torque from the torque trajectory
Mb32 braking torque from the torque trajectory
v1 current speed of the motor vehicle
v31 speed from the speed trajectory
$\Delta M$ drive torque difference
$\Delta Ms$ drive torque difference signal
$\Delta bM$ braking torque difference
$\Delta bMs$ braking torque difference signal
$\Delta v$ speed difference
$\Delta vs$ speed difference
1 vehicle
2 system
3 processor
4 memory
5 communication interface
6 detection unit
7 drive train
8 electric machine
9 battery
10 transmission
11 computer program
12 GNSS sensor
13 MPC algorithm
13.1 high level solver module
14 torque solver module
14 longitudinal dynamics model
15.1 high level cost function
15.2 torque cost function
16 human-machine interface
17 internal combustion engine
18 power electronics
19 brakes
20 navigation system
21 front differential transmission
22 front wheel
23 front wheel
24 speed sensor
25 front axle
26 rear wheel
27 loss model
28 rear wheel
29 rear axle
30 torque sensor
31 speed trajectory
32 torque trajectory
33 environment sensor
34 speed control signal
35 driver
36 gas pedal 37 brake pedal
38 video system
39 audio system
40 visual feedback
41 acoustic feedback
42 tactile feedback

The invention claimed is:

1. A method for model-based predictive control (MPC) of a motor vehicle, comprising:

executing an MPC algorithm, which comprises a high level solver module, a longitudinal dynamics model that models an efficiency of components in the motor vehicle, and a cost function related to the efficiency of the motor vehicle and that is dedicated to the high level solver module, wherein, by executing the high level solver module for an upcoming route segment while taking the longitudinal dynamics model into account, a speed trajectory is calculated that minimizes the cost function to thereby maximize an efficiency of the motor vehicle, according to which the motor vehicle is to travel within a prediction horizon;

sending the speed trajectory calculated by the high level solver module to a human-machine interface as an input value;

processing the speed trajectory calculated by the high level solver module to obtain a control signal in the human-machine interface; and outputting the control signal to a driver of the motor vehicle with the human-machine interface, such that the driver can control the motor vehicle in accordance with the control signal based on the speed trajectory calculated by the high level solver module.

2. The method according to claim 1, wherein the control signal represents the speed trajectory calculated by the high level solver module in the human-machine interface.

3. The method according to claim 1, wherein the human-machine interface comprises:

a video system, which outputs the control signal as visual feedback for the driver; and/or an audio system, which outputs the control signal as acoustic feedback for the driver; and/or a tactile system, which outputs the control signal as tactile feedback for the driver.

4. The method according to claim 1, comprising:

providing the high level solver module with information regarding stationary objects as constraints that the high level solver module takes into account when calculating the speed trajectory.

5. The method according to claim 1, comprising:

providing the high level solver module with information regarding dynamic objects as constraints that the high level solver module takes into account when calculating the speed trajectory.

6. The method according to claim 5, wherein the human-machine interface outputs the speed trajectory calculated by the high level solver module as a suggestion for the driver of the motor vehicle.

7. The method according to claim 1, comprising:

sending a current speed of the motor vehicle to the human-machine interface as an input value;

determining, by the human-machine interface, a speed difference between the current speed of the motor vehicle and an associated speed from the speed trajectory calculated by the high level solver module; and generating a difference signal that represents the speed difference by the human-machine interface as a control signal and output to the driver.

8. A method for model-based predictive control (MPC) of a motor vehicle, comprising:

executing an MPC algorithm, which comprises a torque solver module, a longitudinal dynamics model, and a cost function that is dedicated to the torque solver module, wherein, by executing the torque solver module for a drive unit in the motor vehicle, a drive torque trajectory that minimizes the cost function is calculated, according to which the drive unit is to provide a drive torque within a prediction horizon;

sending the drive torque trajectory calculated by the torque solver module to a human-machine interface as an input value;

sending the human-machine interface a current drive torque in the drive unit as an input value;

determining a drive torque difference by the human-machine interface, wherein an associated drive torque from the drive torque trajectory calculated by the torque solver module is subtracted from the current drive torque; and generating a drive torque control signal by the human-machine interface, and outputting the drive torque control signal to a driver, such that the driver can control the motor vehicle in accordance with the drive torque control signal that is based on the drive torque difference, wherein the human-machine interface comprises a tactile pedal, and wherein the tactile pedal outputs the drive torque control signal as tactile feedback that the driver can feel in his foot.

9. The method according to claim 8, wherein the drive torque trajectory comprises a sequence of braking torques that the brakes are to provide within the prediction horizon, the method comprising:

sending the sequence of braking torques to the human-machine interface as an input;

sending the human-machine interface a current braking torque in the brakes as an input value;

determining a braking torque difference by the human-machine interface, wherein an associated braking torque from the sequence of braking torques calculated by the torque solver module is subtracted from the current braking torque; and generating a braking torque control signal by the human-machine interface and outputting the braking torque control signal to the driver, such that the driver can control the motor vehicle in accordance with the braking torque control signal, which is based on the braking torque difference.

10. The method according to claim 9, wherein the tactile pedal outputs the braking torque control signal as tactile feedback that the driver can feel in his foot.

11. A method for model-based predictive control (MPC) of a motor vehicle, comprising:

executing an MPC algorithm, which comprises a high level solver module, a longitudinal dynamics model, and a cost function that is dedicated to the high level solver module, wherein, by executing the high level solver module for an upcoming route segment while taking the longitudinal dynamics model into account, a speed trajectory is calculated that minimizes the cost function, according to which the motor vehicle is to travel within a prediction horizon;

sending the speed trajectory calculated by the high level solver module to a human-machine interface as an input value;

processing the speed trajectory calculated by the high level solver module to obtain a drive torque control signal and/or in the human-machine interface; and outputting the drive torque control signal to a driver of the motor vehicle with the human-machine interface, such that the driver can control the motor vehicle in accordance with the drive torque control signal based on the speed trajectory calculated by the high level solver module, wherein the human-machine interface comprises a tactile pedal, and wherein the tactile pedal outputs the drive torque control signal as tactile feedback that the driver can feel in his foot.

* * * * *